(12) United States Patent
Matori

(10) Patent No.: US 8,657,371 B2
(45) Date of Patent: Feb. 25, 2014

(54) CAR SEAT

(75) Inventor: Tadahiro Matori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 78 days.

(21) Appl. No.: 13/040,284

(22) Filed: Mar. 4, 2011

(65) Prior Publication Data

US 2011/0266854 A1 Nov. 3, 2011

(30) Foreign Application Priority Data

Apr. 28, 2010 (JP) ................................. 2010-102892

(51) Int. Cl.
*A47C 7/62* (2006.01)
(52) U.S. Cl.
USPC .................................. 297/188.04; 297/250.1
(58) Field of Classification Search
USPC ............. 297/188.04, 188.07, 483, 484, 250.1
See application file for complete search history.

(56) References Cited

U.S. PATENT DOCUMENTS

| 4,541,654 | A | * | 9/1985 | Jonasson ..................... 280/801.1 |
| 4,720,148 | A | * | 1/1988 | Anthony et al. ............... 297/474 |
| 5,384,946 | A | * | 1/1995 | Sundstedt et al. ............. 297/238 |
| 5,468,044 | A | * | 11/1995 | Coman .................... 297/216.11 |
| 5,503,461 | A | * | 4/1996 | Schreier ......................... 297/484 |
| 5,611,589 | A | * | 3/1997 | Fujii et al. ......................... 296/64 |
| 5,722,724 | A | * | 3/1998 | Takei et al. .................... 297/238 |
| 5,779,319 | A | * | 7/1998 | Merrick ......................... 297/484 |
| 5,951,084 | A | * | 9/1999 | Okazaki et al. ............. 296/37.16 |
| 6,048,034 | A | * | 4/2000 | Aumont et al. ............... 297/478 |
| 6,059,358 | A | * | 5/2000 | Demick et al. ........... 297/188.04 |
| 6,695,412 | B2 | * | 2/2004 | Barger et al. ................. 297/484 |
| 6,860,550 | B2 | * | 3/2005 | Wojcik .......................... 297/163 |
| 7,077,475 | B2 | * | 7/2006 | Boyle ......................... 297/250.1 |
| 2007/0052264 | A1 | * | 3/2007 | Lee .......................... 297/188.04 |
| 2007/0182230 | A1 | * | 8/2007 | Bhatia et al. ............... 297/378.1 |

FOREIGN PATENT DOCUMENTS

| JP | 2002-192998 | 7/2002 |
| KR | 20020011461 A | 2/2002 |

OTHER PUBLICATIONS

Chinese Office Action for corresponding CN Application No. 201110096506.3, Aug. 31, 2012.

* cited by examiner

*Primary Examiner* — David Dunn
*Assistant Examiner* — Richard Lowry
(74) *Attorney, Agent, or Firm* — Ditthavong Mori & Steiner, P.C.

(57) ABSTRACT

A car seat includes a seat back and a back belt. The seat back is foldable from an erect position into a substantially horizontal folded position. The back belt is disposed in a position in which the back belt, when extending along the seat back, is able to restrain an item or a baby being placed on a back surface of the seat back in the folded position.

6 Claims, 5 Drawing Sheets

FIG. 3A
FIG. 3B
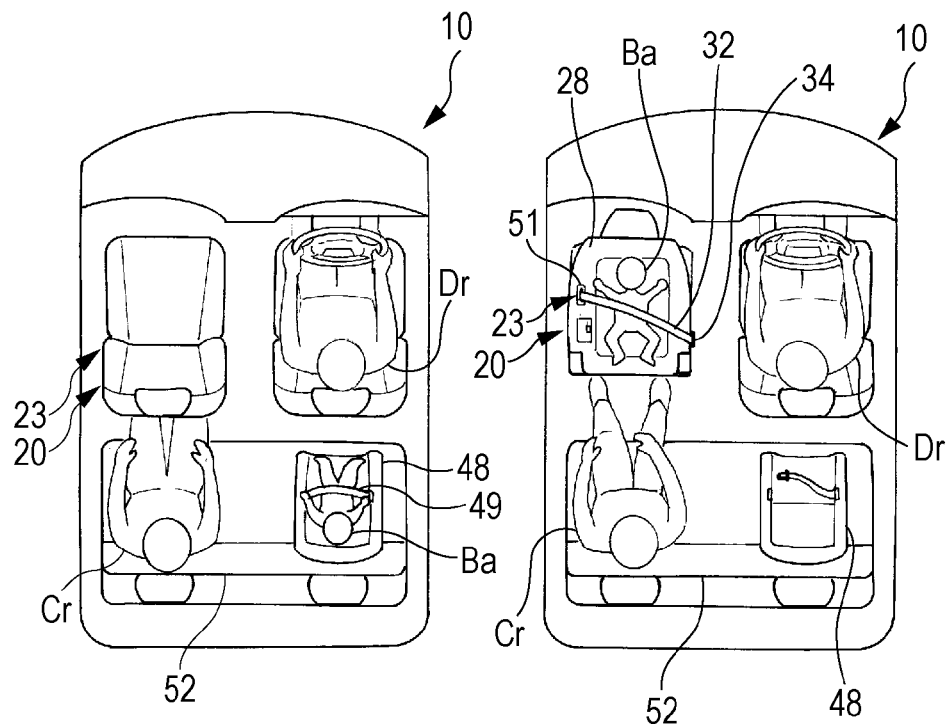
FIG. 3C
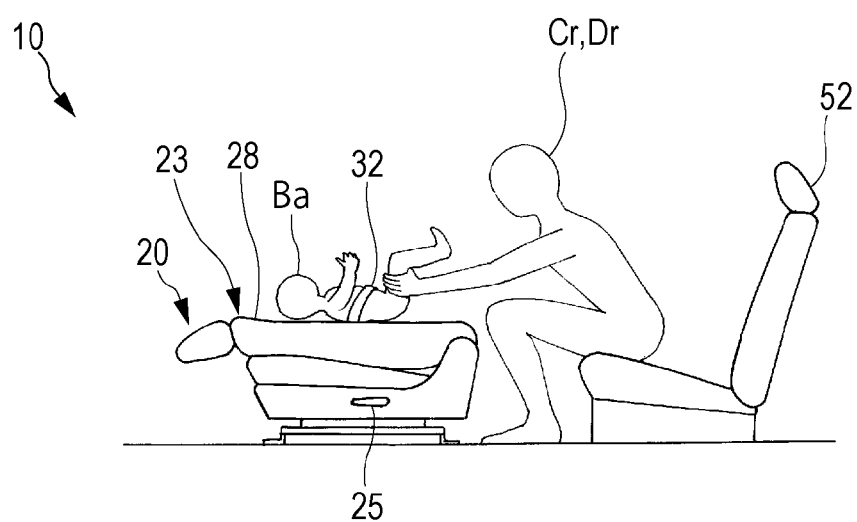

CAR SEAT

CROSS-REFERENCE TO RELATED APPLICATIONS

The present application claims priority under 35 U.S.C. §119 to Japanese Patent Application No. 2010-102892, filed Apr. 28, 2010, entitled "Car Seat". The contents of this application are incorporated herein by reference in their entirety.

BACKGROUND OF THE INVENTION

1. Field of the Invention

The present invention relates to a car seat.

2. Description of the Related Art

Some car seats have seat backs that fold forward. For such car seats, technologies that effectively utilize substantially horizontal seat backs have been developed (for example, see FIG. 9 of Japanese Unexamined Patent Application Publication No. 2002-192998).

A car seat disclosed in the above document includes a seat back that can fold forward. By folding the seat back into a substantially horizontal position, a back surface of the seat back can be used as a table top.

It is desirable to place a variety of items on the back surface of the substantially horizontal seat back according to need. For example, the back surface is desirably used to place an item thereon in performing a task. The back surface is desirably used to place a baby thereon when changing a diaper. In such cases, a structure that allows various tasks to be easily performed is preferable.

SUMMARY OF THE INVENTION

According to one aspect of the present invention, a car seat includes a seat back and a back belt. The seat back is foldable from an erect position into a substantially horizontal folded position. The back belt is disposed in a position in which the back belt, when extending along the seat back, is able to restrain an item or a baby being placed on a back surface of the seat back in the folded position.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 3A, 3B and 3C illustrate operation of the car seat;

DESCRIPTION OF THE EMBODIMENTS

Figure 1:
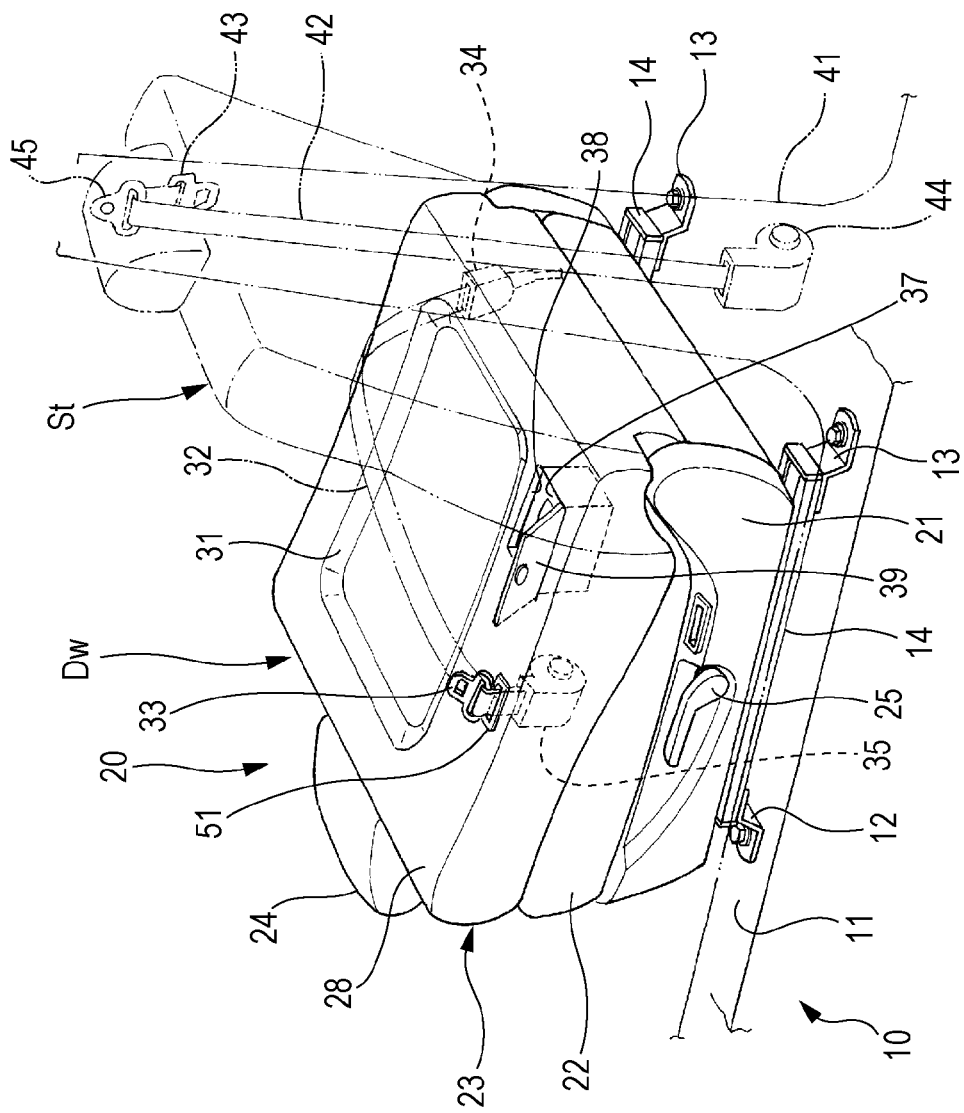
FIG. 1 is a perspective view illustrating a car seat according to an embodiment of the present invention.

Embodiments according to the present invention will be described below with reference to the drawings, wherein like reference numerals designate corresponding or identical elements throughout the various drawings.

First Embodiment

Figure 2:
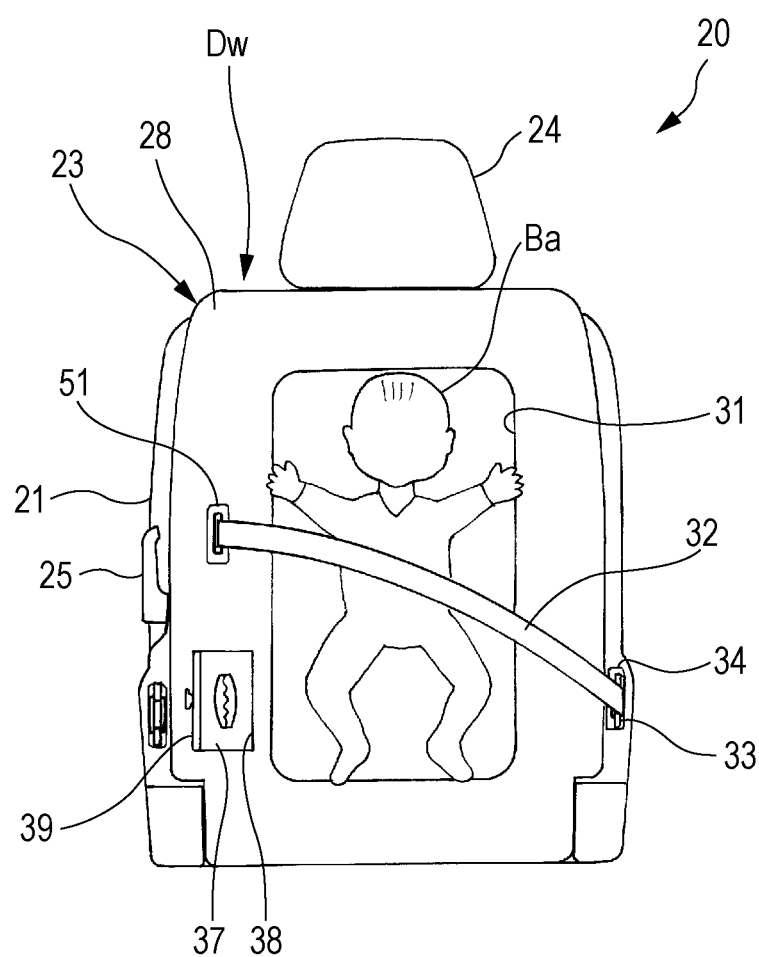
FIG. 2 is a plan view illustrating a car seat according to a first embodiment.

Referring to FIGS. 1 and 2, the structure of a car seat according to a first embodiment will be described.

FIG. 1 illustrates a car seat 20 seen from a diagonally backward position. FIG. 2 illustrates the car seat 20 in a folded position Dw seen from above. An example of the car seat 20 illustrated in FIGS. 1 and 2 is a front passenger seat in a car with a right-hand steering wheel.

The car seat 20 is supported so as to be slidable in a longitudinal direction of a car 10 by supports 12 and 13, which are mounted on a floor 11 of the car 10, and rails 14, which are supported by the supports 12 and 13.

The car seat 20, which is supported so as to be slidable in the longitudinal direction of the car 10, includes a seat bottom portion 21 supported by the rails 14, a seat cushion 22 supported by the seat bottom portion 21, a seat back 23 having been folded onto an upper surface of the seat cushion 22, and a head rest 24 disposed at the top of the seat back 23.

A lever 25 is disposed at a side of the seat bottom portion 21. By operating the lever 25, the seat back 23 is folded from an erect position St, which is indicated by two-dot chain lines in FIG. 1, into the folded position Dw, which is indicated by solid lines in FIG. 1.

The seat back 23 has a recess 31 formed in a back surface 28 thereof, into which an item or a baby Ba is placed (hereafter collectively referred to as "baby"). The baby Ba placed in the recess 31 is restrained with a back belt 32 that extends along the back surface 28 of the seat back 23.

The back belt 32 includes a tongue 33 at an end thereof. The tongue 33 is engageable with a buckle 34 disposed at a side of the seat cushion 22. When the tongue 33 is disengaged from the buckle 34, the back belt 32 is wound up by a belt winding mechanism 35 disposed inside the seat back 23.

Since the belt winding mechanism 35 is provided, the back belt 32 is wound up when not in use. The back belt 32 is pulled out only when needed. This can achieve an improved appearance when the back belt 32 is not needed.

In addition, the seat back 23 includes a storage portion 38 that houses an item such as tissue paper 37 thereinside. A lid 39 is swingably mounted over an opening of the storage portion 38. When a task is performed using the back surface 28 of the seat back 23, the storage portion 38 enables the item needed for the task to be quickly taken out therefrom. That is, the storage portion 38 helps increase convenience in performing the task.

Near the car seat 20 structured as above, a center pillar 41 stands as illustrated in FIG. 1. The center pillar 41 includes an occupant restraining belt 42 that restrains an occupant sitting on the seat cushion 22 when the seat back 23 is erect.

The occupant restraining belt 42 includes a tongue 43 at an end thereof. The tongue 43 is engageable with the buckle 34. When the tongue 43 is disengaged from the buckle 34, the occupant restraining belt 42 is wound up by a belt winding mechanism 44 disposed in the center pillar 41. The occupant restraining belt 42 is supported by an upper anchor 45 mounted on the center pillar 41.

The tongue 33 of the back belt 32 and the tongue 43 of the occupant restraining belt 42 are engageable with the buckle 34. When the car 10 is being driven, the tongue 43 of the occupant restraining belt 42 is inserted into the buckle 34 in order to restrain an occupant. When the car 10 is parked, by inserting the tongue 33 of the back belt 32 into the buckle 34, a task can be performed while the baby Ba is restrained. Compared to a case where the buckles 34 are individually provided, the number of components can be reduced.

Referring to the drawings that follow, operation of the car seat 20 will be described.

FIG. 3A is an interior view of the car 10 seen from above when the car 10 is being driven. FIG. 3B is an interior view of the car 10 seen from above when the car 10 is parked and a task is being performed. FIG. 3C is an interior view of the car 10 seen from a side, in which the task illustrated in FIG. 3B is being performed.

As illustrated in FIG. 3A, while the car 10 is being driven, the baby Ba is seated in a baby seat 48, which is a so-called "child seat", and restrained with a belt 49 provided in the baby seat 48.

A task such as changing a diaper may be performed when the car 10 is parked. In such a task, an occupant Cr initially operates the lever 25 in order to fold the seat back 23. Next, the baby Ba is moved onto the back surface 28 of the folded seat back 23 and placed on the back surface 28. After the baby Ba has been placed, the back belt 32 is pulled out through a hole 51 that is open in the back surface 28 and the back belt 32 is secured to the buckle 34.

By securing the back belt 32 to the buckle 34, the baby Ba is restrained. The baby Ba placed on the back surface 28 of the seat back 23 is restrained before the task is performed. By restraining movement of the baby Ba, the task can be easily performed. That is, a task can be easily performed using the back surface 28 of the seat back 23 that is in a substantially horizontal state.

Referring also to FIGS. 1 and 2, the baby Ba is placed on the back surface 28 (recess 31) of the seat back 23 while the tongue 33 is disengaged and away from the buckle 34. After the baby Ba has been placed on the back surface 28, the tongue 33 is inserted into the buckle 34. The baby Ba can be easily restrained and the task can be more easily performed.

Alternatively, the occupant Cr can sit in the car seat 20 while the car 10 is being driven, and, after the car 10 has been parked, can move to a rear seat 52 in order to perform a task. Alternatively, a driver Dr can move to the rear seat 52 in order to perform a task after parking the car 10.

As illustrated in FIG. 3C, by mounting the car seat 20 on the car 10, the occupant Cr (or the driver Dr) can perform a task while sitting in the rear seat 52. That is, a task can be performed in a posture that is convenient for performing the task even in the narrow interior space of a car.

In particular, it is advantageous to mount the car seat 20 in the car 10, a work space of which in the rear seat 52 has been reduced due to installation of the baby seat 48.

Other embodiments according to the present invention will be described below with reference to FIGS. 4 and 5.

Second Embodiment

A second embodiment according to the present invention will be described with reference to the drawings.

Figure 4:
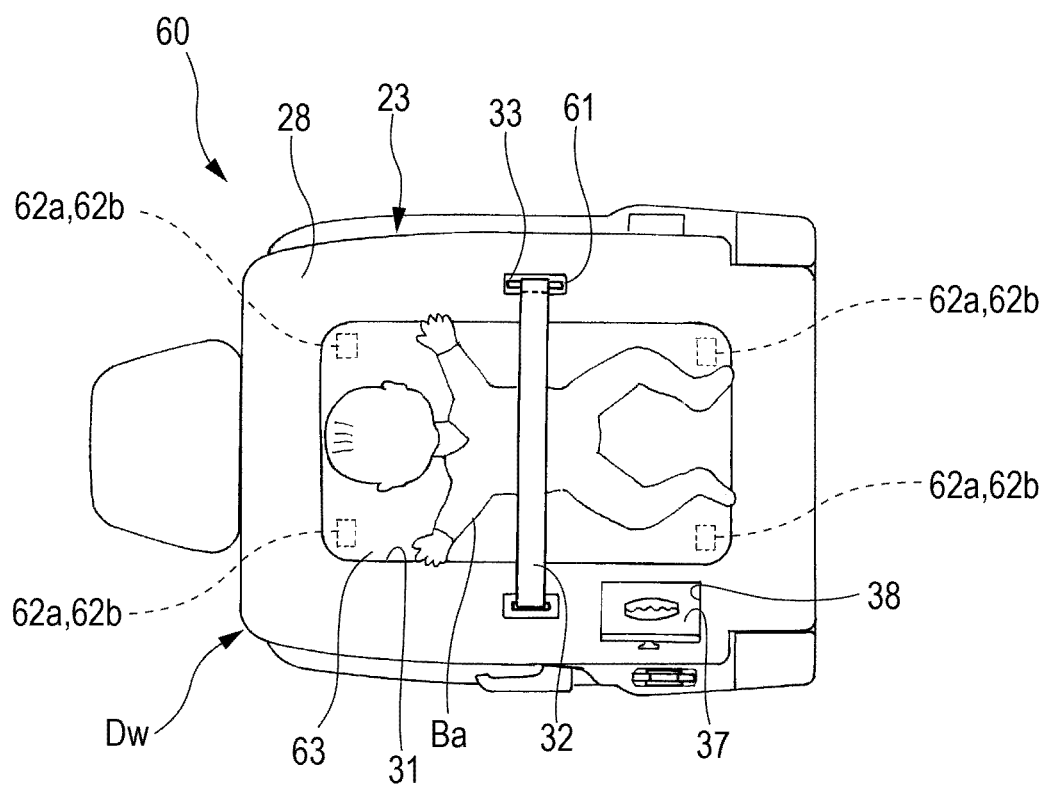
FIG. 4 is a plan view illustrating a car seat according to a second embodiment.

FIG. 4 illustrates a car seat 60 according to the second embodiment seen from above. FIG. 4 corresponds to FIG. 2.

A buckle 61 is disposed in the seat back 23. Since components needed for restraint are gathered in the back surface 28 of the seat back 23, the car seat 20 can be more compact. This is preferable since the interior space of the car can be more effectively utilized.

In addition, the recess 31 includes hook-and-loop fasteners 62a attached thereto. The recess 31, to which the hook-and-loop fasteners 62a are attached, is covered with a fabric 63 made of a material such as towel cloth, to which hook-and-loop fasteners 62b are attached, so as to engage the hook-and-loop fasteners 62a and 62b with each other.

By covering the recess 31 with the fabric 63, the baby Ba can comfortably spend time. The hook-and-loop fasteners 62a and 62b are provided so as to removably attach the fabric 63 to the recess 31. Since the fabric 63 is removable, it is washable. This is preferable in terms of hygiene.

Third Embodiment

A third embodiment according to the present invention will be described with reference to the drawings.

Figure 5:
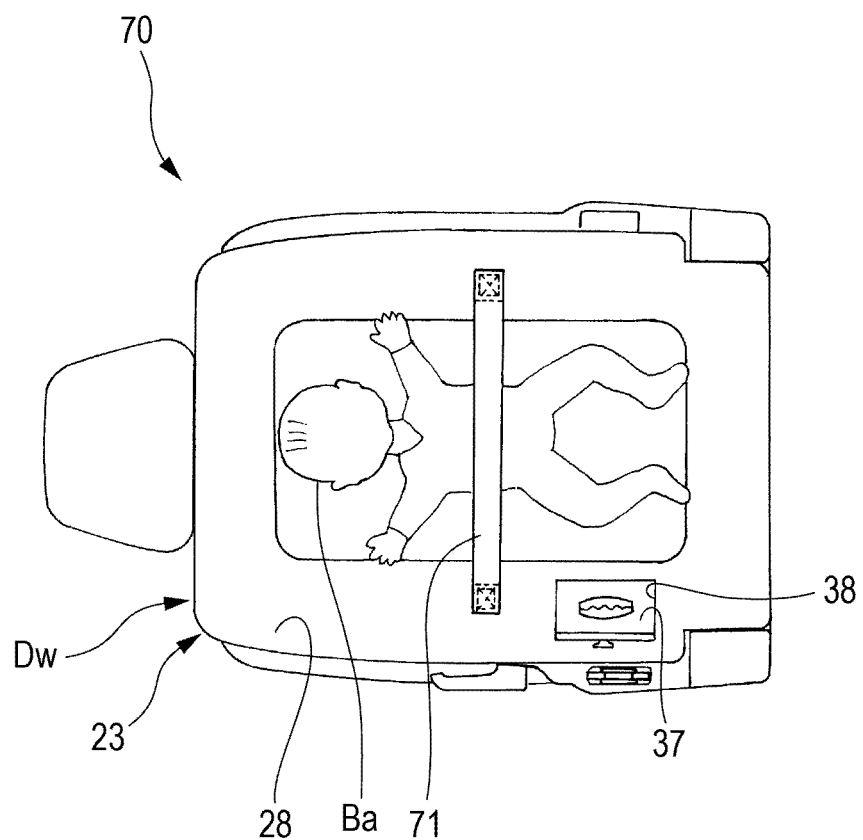
FIG. 5 is a plan view illustrating a car seat according to a third embodiment.

FIG. 5 illustrates a car seat 70 according to the third embodiment seen from above. FIG. 5 corresponds to FIGS. 2 and 4.

A rubber back belt 71 is stitched to the back surface 28 of the seat back 23. A belt such as the back belt 71 can restrain the movement of the baby Ba, thereby facilitating performing of a task. In addition, when the rubber back belt 71 is used, the number of components needed for restraining the baby Ba is reduced. Therefore, manufacturing of the car seat 70 at reduced costs can be achieved.

The car seat 20 according to the embodiment of the present invention has been described above with an example of the front passenger seat. When seats are arranged, for example, in three rows in a car, the back belt can be disposed in a back surface of a seat in the second row. In other words, the back belt can be disposed in a back surface of a desired seat.

In addition, there may be a case in which a so-called bench seat is installed in the second raw. In such a case, the back belt can be extended in the longitudinal direction of the car for a seat in the folded position. That is, the back belt is not necessarily extended in a lateral direction of the car. The back belt can be extended in a desired direction so as to match to a shape of a seat.

The belt described above is retracted into the back surface of the seat back. Alternatively, for example, a hook may be provided in the back surface of the seat back so as to hold the tongue hooked thereto. Furthermore, another belt may be provided on the side of the buckle such that the buckle can be hooked to the above-described hook. As described above, the car seat described herein can be structured without significantly changing an existing seat back and, in addition, does not affect the feeling of being seated experienced by an occupant sitting in the seat with the seat back erect.

The car seat according to the embodiment of the present invention is preferably applicable to a four-wheel vehicle with a small interior space.

According to the embodiment of the present invention, a car seat includes a seat back that is foldable from an erect position into a substantially horizontal folded position. The car seat also includes a back belt that is disposed in a position in which the back belt, when extending along the seat back, is able to restrain an item or a baby placed on a back surface of the seat back in the folded position. An item or a baby placed on the back surface of the seat back is restrained before a task is performed. By restraining movement of the item or the baby, the task can be easily performed. That is, the task can be easily performed using the back surface of the substantially horizontal seat back.

It is preferable that the car seat further include a buckle that is engageable with a tongue included in the back belt. In this case, the baby or the item is placed on the back surface of the seat back while the tongue is disengaged and away from the buckle. After the baby or the item is placed on the back surface, the tongue is inserted into the buckle. The item or the baby can be easily restrained and the task can be more easily performed.

It is preferable that the buckle be disposed in the seat back. In this case, since components needed for restraint are gathered in the back surface of the seat back, the car seat can be more compact. This is preferable since an interior space of a car can be more effectively utilized.

It is preferable that the buckle, which is engageable with the tongue provided in the back belt, be also engageable with another tongue provided in an occupant restraining belt, which is disposed in a car in order to restrain an occupant sitting in a seat cushion of the car seat when the seat back is erect. In this case, when the car is being driven, the tongue of the occupant restraining belt is inserted into the buckle in order to restrain an occupant. When the car is parked, by inserting the tongue of the back belt into the buckle, a task can be performed while the item or the baby is restrained. Compared to a case where the buckles are individually provided, the number of components can be reduced.

It is preferable that a belt winding mechanism, which is capable of winding up the back belt, be provided inside the seat back. In this case, since the belt winding mechanism is provided, the back belt is wound up when not in use. The back belt is pulled out only when needed. This can achieve an improved appearance when the back belt is not needed.

Obviously, numerous modifications and variations of the present invention are possible in light of the above teachings. It is therefore to be understood that within the scope of the appended claims, the invention may be practiced otherwise than as specifically described herein.

What is claimed is:

1. A car seat comprising:
a seat back having a front surface and a back surface opposite to the front surface, the seat back being foldable from an erect position into a folded position in which the back surface is substantially horizontal;
a back belt attached to the seat back and configured to extend from the back surface, the back belt being configured to extend along the seat back to restrain an item or a baby placed on the back surface of the seat back in the folded position;
a first belt winding mechanism that is provided inside the seat back and that is capable of winding up the back belt;
an occupant restraining belt configured to restrain an occupant sitting in a seat cushion of the car seat and against the front surface of the seat back when the seat back is in the erect position; and
a second belt winding mechanism configured to wind up the occupant restraining belt,
wherein the back belt comprises a first tongue attached to an end of the back belt, wherein the first tongue is configured to be engageable with a buckle disposed at a side of the car seat, wherein the back surface comprises a hole that faces rearward of the seat back, and
wherein the back belt is configured to be pulled out from the hole, and
wherein a second tongue is attached to the occupant restraining belt, the second tongue being configured to be engageable with the buckle.

2. The car seat according to claim 1, further comprising an additional buckle that is directly attached to the seat back, wherein the first tongue of the back belt is configured to be engageable with the additional buckle.

3. The car seat according to claim 1, further comprising:
a lower portion,
wherein the seat back is pivotally attached to the lower portion, and
wherein the buckle is directly attached to the lower portion.

4. The car seat according to claim 1,
wherein the back belt is directly affixed to the back surface of the seat back.

5. The car seat according to claim 1,
wherein the back belt is rubber.

6. The car seat according to claim 1, wherein the front surface of the seat back is configured to face in a forward direction of a car in which seat back is configured to be provided when the seat back is in the erect position, and wherein the back surface of the seat back is configured to face in a rearward direction of the car when the seat back is in the erect position.

* * * * *